Jan. 31, 1956   R. F. WORLIDGE   2,733,079
SELF-ENGAGING AND SELF-SEALING PIPE COUPLINGS, ESPECIALLY
APPLICABLE TO FLIGHT REFUELLING PURPOSES
Filed May 19, 1952   3 Sheets-Sheet 1

Inventor
Ronald F. Worlidge
By Watson, Cole, Grindle
& Watson
Attorneys

Jan. 31, 1956 R. F. WORLIDGE 2,733,079
SELF-ENGAGING AND SELF-SEALING PIPE COUPLINGS, ESPECIALLY
APPLICABLE TO FLIGHT REFUELLING PURPOSES
Filed May 19, 1952 3 Sheets-Sheet 2

FIG. 2.

Inventor
Ronald F. Worlidge
By Watson, Cole, Grindle &
Watson
Attorneys

United States Patent Office 2,733,079
Patented Jan. 31, 1956

2,733,079

SELF-ENGAGING AND SELF-SEALING PIPE COUPLINGS, ESPECIALLY APPLICABLE TO FLIGHT REFUELLING PURPOSES

Ronald Frederick Worlidge, Lower Parkstone, England, assignor to Flight Refuelling Limited, London, England, a British company Application May 19, 1952, Serial No. 288,599

6 Claims. (Cl. 284—12)

This invention relates to a self-engaging, self-sealing plug-and-socket type pipe coupling, of which the socket part has a flared mouth and tapered throat adapted to receive the plug part, constituted by a tapered nozzle, and is provided with spring-loaded latches adapted to engage an external circumferential groove formed in the nozzle at or just beyond the base of the tapered portion of the nozzle, and in which both the socket part and the nozzle are provided with axially displaceable valves which seal the openings of the socket part and the nozzle when disconnected.

The socket part of the coupling may be connected to the end of a pipe or hose by means of a ball-and-socket joint.

In the socket part of the improved coupling according to the present invention the axially displaceable valve is constituted by a poppet valve supported coaxially in the socket-shell on the inner ends of levers which are fulcrumed on the socket-shell, and an annular seal, providing seatings for the rim of the terminal opening of the co-operating nozzle and for the inner face of the rim of the valve, is mounted on a sleeve-like seal-carrier, which slides in a part of the socket-shell extending inwardly of the throat and engages the outer ends of the levers, and is loaded by spring means tending to press it outwards and, through the action of the levers, to withdraw the valve inwards and cause it to seat on the annular seal.

The annular seal preferably extends outwards from the axis of the socket to seal the sliding joint between the seal-carrier and the socket-shell.

In the plug part or nozzle of the improved coupling according to the present invention the axially displaceable valve is constituted by a plunger, spring-loaded to seat on the inside of the opening at the extremity of the nozzle, being provided for this purpose with a sealing ring, which extends inwards towards the axis of the nozzle from the rim of the opening to seat also on the outer face of the poppet vave in the socket.

Preferably, the tapered part of the nozzle may not extend to the extreme tip but may terminate at a shoulder, the nozzle-profile being continued towards the tip by a parallel portion whose diameter is just small enough to pass with the minimum practicable working clearance through the narrowest part of the throat of the socket, which may have a corresponding shoulder and parallel portion. Further, the nozzle and socket may have mating parallel portions at the opposite end of their tapered portions.

When the socket- and plug-parts of the coupling are separated the seal-carrier of the socket is displaced outwards by its spring loading, the socket-valve being at the same time withdrawn inwards until the inner face of its rim meets and seals on the annular seal carried by the seal-carrier, thus effectively sealing the opening of the socket. When the nozzle is inserted into the socket it is first of all guided into a central position by the flared mouth of the socket and finally centred and aligned by mutual engagement of the parallel portions of the socket and nozzle, and when the shoulder of the nozzle meets the shoulder of the socket the circumferential groove of the nozzle registers with the latches of the socket, which thereupon enter the groove and automatically lock the nozzle into the socket, until or unless the coupling is subjected to a tension exceeding a critical value sufficient to spring the latches out of the groove. However, before the shoulders of the nozzle and socket part meet, the tip of the nozzle meets the annular seal carried by the seal-carrier of the socket, and the exposed inner portion of the sealing ring on the nozzle-valve plunger meets the outer face of the rim of the socket-valve. At this position the parallel portions of the nozzle have come into register with their counterparts in the socket and keep the nozzle and socket coaxial as the nozzle continues to advance and push the seal-carrier inwards against its spring loading. This movement, transmitted to the socket-valve by means of the lever support, causes the socket-valve to move outwards and pass through the opening at the extremity of the nozzle and press the nozzle-valve plunger inwards from its seating against its own spring loading. This action opens both the socket- and nozzle-valves, leaving an annular passage through the coupling between the seal-carrier and the outer shell of the nozzle on the one hand and the inner face of the socket-valve and the outer diameter of the nozzle-valve plunger on the other, the joint between the extremity of the nozzle and the seal-carrier being sealed by the annular seal carried by the latter and the joint between the socket- and nozzle-valves being sealed by the sealing ring carried by the nozzle-valve plunger.

When the nozzle is withdrawn from the socket, which is effected simply by pulling them apart with a tension exceeding the critical value previously mentioned, the seal-carrier moves outwards under the action of its spring loading, withdrawing the socket-valve inwards and allowing the nozzle-valve plunger to be returned to its seating on the inside of the rim of the opening of the nozzle by its own spring loading; and it is to be noted that the extremity of the nozzle cannot unseat from the annular seal carried by the seal-carrier, nor can the sealing ring carried by the nozzle-valve plunger unseat from the socket-valve until the latter has seated on the annular seal and the sealing ring of the nozzle-valve has seated on the rim of the nozzle-opening. Consequently, the amount of fluid that can escape during uncoupling is limited to the amount trapped between the annular seal carried by the seal-carrier and the sealing ring carried by the nozzle-valve plunger in the clearance between the rim of the socket-valve and the rim of the nozzle-opening. Since this clearance is quite small, the amount of fluid that can be so trapped is inconsiderable.

According to a feature of the invention, the seal-carrier and the socket-valve may be so shaped and dimensioned that the area of their inner faces, projected perpendicular to the axis of the socket, are so proportioned, having regard to the leverages of the levers interconnecting them, that with the coupling disconnected the force exerted by fluid pressure within the socket on the socket-valve and tending to open the valve is more than counter-balanced by the opposed force of the fluid-pressure on the seal-carrier tending to close the valve.

Similarly, the nozzle-valve plunger is preferably so shaped and dimensioned that, when the coupling is connected and the valves are open, the resultant force exerted by fluid-pressure within the coupling on the parts of the plunger exposed to the fluid assists the nozzle-valve spring-loading in holding the sealing ring onto its seating on the socket-valve.

It will then follow that the force causing the annular seal to seat on the extremity of the nozzle-shell and tending to push the nozzle out of the coupling is the sum of the forces exerted by nozzle-valve spring-loading and the fluid-pressure on the nozzle-valve plunger, less the force exerted by the fluid-pressure on the socket-valve (which necessarily exceeds the opposed force exerted by the fluid-pressure on the plunger), all multiplied by the leverage of the levers, plus the forces exerted by the seal-carrier spring-loading and by the fluid-pressure on the seal-carrier. Preferably, the arrangement is such that the excess relieving force exerted by the fluid-pressure on the socket-valve over that exerted by the fluid-pressure on the plunger is as great as possible.

The following description refers to the accompanying drawings, which illustrate by way of example a preferred embodiment of the invention.

In the drawings,

Figure 2 is a view similar to Figure 1 with the nozzle disengaged but just in contact with the annular seal of the socket, both valves being closed;

Figure 1:
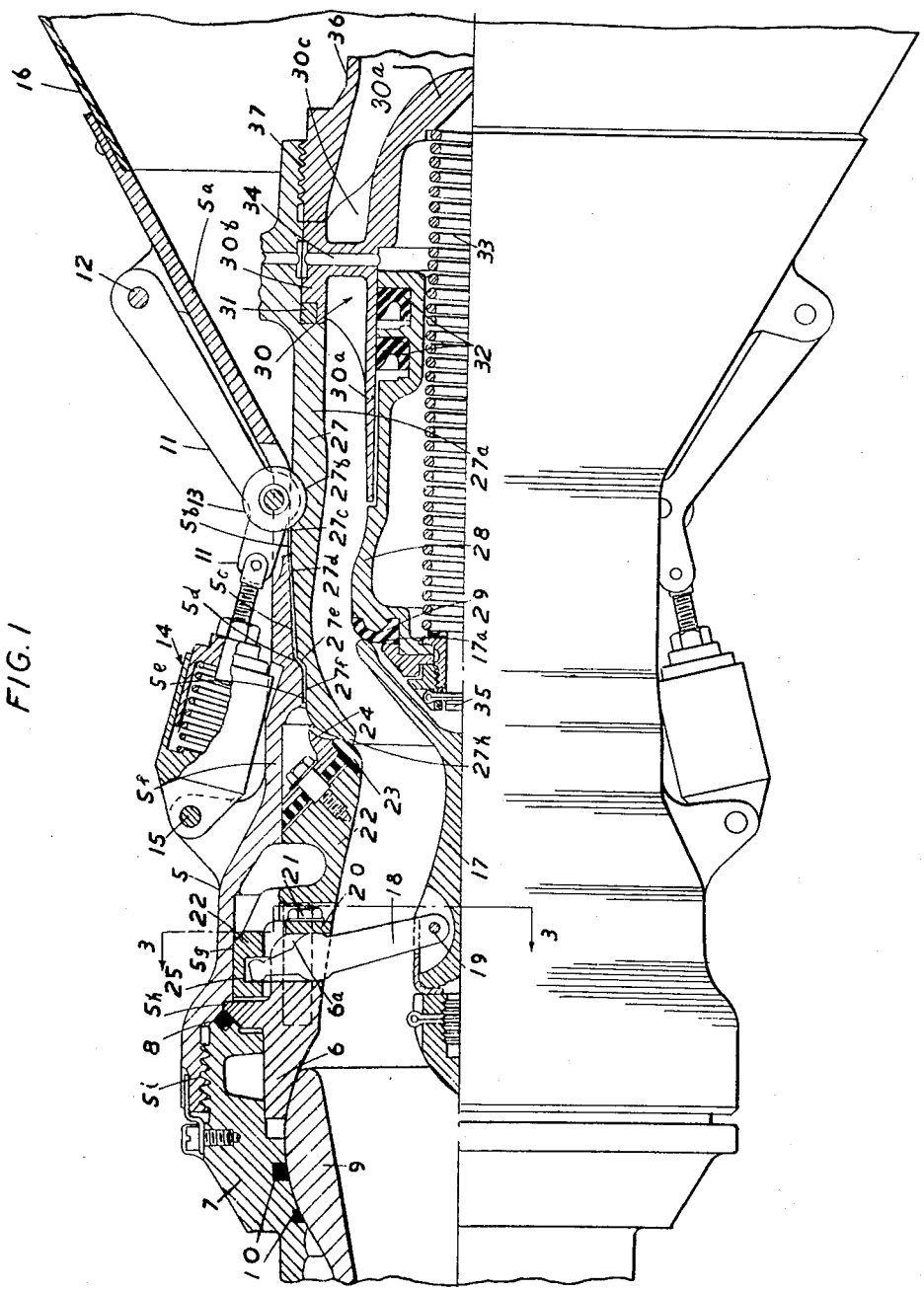
Figure 1 is a half axial section of the complete coupling in the engaged position with the valves open.

In what follows the socket part of the complete coupling assembly illustrated in the drawings will be referred to for convenience as "the coupling," and the plug part of the coupling assembly will be referred to as "the nozzle." The coupling comprises a shell 5 whose internal surface comprises several regions succeeding one another from the mouth end inwards and designated 5a to 5i, as follows: a conical flared mouth 5a, parallel portion 5b, a throat comprising a shallow female conical taper 5c, a female conical shoulder 5d and a parallel portion 5e, a further parallel portion of larger diameter 5f, a still further parallel portion of still larger diameter 5g, a shoulder 5h and an internal screw thread 5i. The coupling further comprises a slotted collar 6 having slots 6a, and a nut 7 having an external thread engaging the thread 5i of the shell 5. The collar 6 has an external flange engaging the shoulder 5h of the shell 5, and the joint between the collar flange, the shell and the nut 7 is sealed by means of a sealing ring 8. The inner surfaces of the collar 6 and nut 7 are formed with female spherical portions engaging a male spherical hollow ball fitting 9 which constitutes the terminal member of a hose or the like, not illustrated. The ball 9 and spherical parts of the collar 6 and nut 7 constitute a ball-and-socket joint by which the coupling is attached to the hose. The joint is sealed by means of sealing rings 10 mounted in internal circumferential grooves of the nut 7.

The coupling carries a number of latching devices adapted to engage and retain the nozzle when inserted into the coupling. These latching devices comprise latch levers 11 pivoted at 12 on lugs extending from the outside of the mouth part 5a of the shell 5, rollers 13 mounted on the levers 11 and spring-loaded plunger assemblies 14 pivotally connected to the levers 11 and pivoted at 15 on lugs extending from the rear part of the coupling shell 5. The coupling shell is slotted near the junction of the mouth part 5a and the parallel portion 5b to allow the latch rollers 13 to extend through the wall of the coupling shell to engage the nozzle when inserted into the coupling.

The mouth part 5a of the coupling shell is extended by means of a sheet metal cone 16 which serves as a guide for the nozzle when entering the coupling, and, when the apparatus is intended for flight refuelling, constitutes a drogue for applying drag to the end of a trailed hose or pipe on which the coupling is mounted, causing the hose to trail substantially horizontally.

Figure 3:
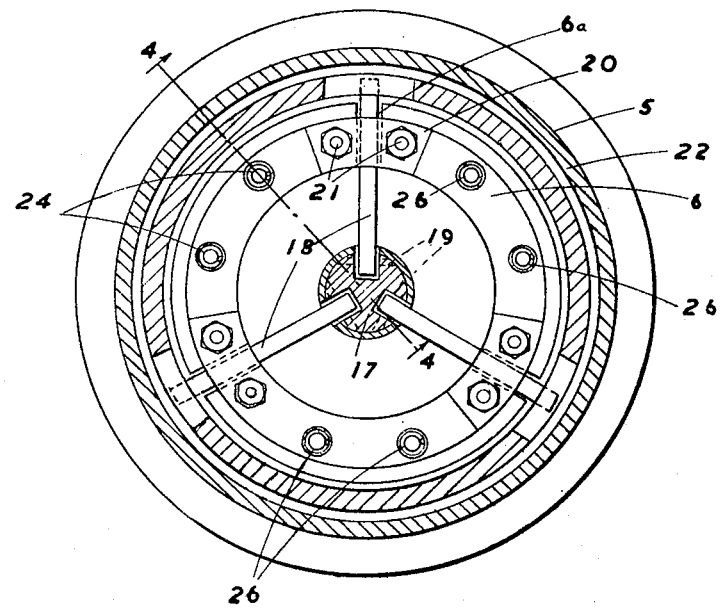
Figure 3 is a transverse section on the lines 3—3 of Figures 1 and 4.

Centrally located within the coupling shell is a poppet valve 17 pivotally suspended at 19 on three levers 18 (see also Figure 3) fulcrumed in the slots 6a of the slotted collar 6, for which purpose the levers have rounded enlargements which make rolling and sliding contact on the bottoms of the slots 6a and on cover plates 20 which are secured by studs 21 and close the open ends of the slots.

The parallel portions 5f and 5g of the coupling shell 5 form sliding bearings for a sleeve-like seal carrier 22 carrying an annular seal 23 secured by an annular retaining plate 24. The outer edge of this seal 23 seals the sliding joint between the seal carrier 22 and the parallel portion 5f of the coupling shell and the inner edge of the seal 23 provides a seating for the rear face of the rim of the poppet valve 17 (see Figure 2). It also provides a seating for the tip of the nozzle (see Figures 1 and 2) as hereinafter described.

Figure 4:
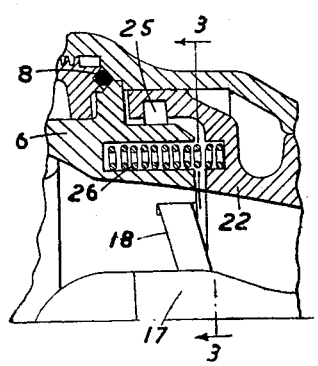
Figure 4 is a fragmentary section on the line 4—4 of Figure 3.

In the seal carrier 22 is formed an internal circumferential groove 25 in which the outer extremities of the levers 18 engage, these extremities being formed with rounded surfaces to make rolling and sliding contact on the sides of the groove 25. The seal carrier is urged towards the mouth of the coupling shell, that is, towards the position shown in Figure 2, by a number of springs 26 retained in pockets of the slotted collar 6 and entering pockets of the seal carrier 22 (see Figure 4).

The nozzle comprises a nozzle shell 27 whose outer contour is composed of a number of regions succeeding one another from the root end towards the tip and designated 27a to 27g, as follows: a parallel portion 27a, a circumferential groove 27b whose radius corresponds to that of the latch rollers 13, a parallel portion 27c which is in effect a continuation of the parallel portion 27a, a tapered portion 27d in the form of a male cone having the same vertical angle as the conical taper 5c of the throat of the coupling shell, a male conical shoulder 27e of corresponding angle to the female conical shoulder 5d of the coupling shell, a parallel portion 27f and a rounded nose 27g. The parallel portions 27a, 27c and 27f respectively are clearance fits in the parallel portions 5b and 5e respectively of the coupling shell 5, the clearances being determined by the cumulative tolerances in the dimensions of the various parts of the nozzle and coupling.

Centrally situated in the nozzle shell is a nozzle valve plunger 28 carrying a sealing ring 29 which seats against the inner face of the terminal opening of the nozzle shell 27 (see Figure 2) and also provides a seating for the outer face of the rim of the poppet valve 17 of the coupling (see Figures 1 and 2). The nozzle valve plunger is slidably supported in a spider 30 consisting of the following portions formed integrally, e. g. as a casting, viz. a hollow boss 30a, a sleeve 30b and radial webs 30c. The sleeve 30b is recessed into the nozzle shell 27, the joint being sealed by a sealing ring 31, and is secured against the end of a hollow nozzle-supporting-member 36 to which the nozzle shell is connected by a threaded joint 37. The spider boss 30a has a cylindrical bore in which the plunger 28 slides, the joint being sealed by U-section seal rings 32; and a nozzle valve spring 33 enclosed within and abutting on the spider boss 30a and within the hollow plunger 28 urges the latter outwards to seat in the terminal opening of the nozzle shell, as shown in Figure 2.

The interior of the nozzle valve plunger and spider boss is vented to atmosphere by means of a vent remote from the face of the plunger and constituted by a passage 34 passing through one of the spider webs 30c, the spider sleeve 30b and the nozzle shell 27. The plunger also has a vent at the extreme tip which may, if desired, be larger than the first mentioned vent and also covered by a gauze disc 35 to exclude ice and foreign matter from the interior of the plunger. When the plunger is seated on the rim of the coupling valve 17 the latter covers the vent 35, which is therefore inoperative and venting of the nozzle valve and spider boss takes place through the rear vent 34. The functions of the vents 34 and 35 will be further described below.

When the nozzle is inserted into the coupling it is first approximately centred, if out of line, by engagement of its tip with the flared mouth 5a of the coupling and as it advances is finally centralised and aligned by engagement of its parallel portions 27c and 27f with the corresponding parallel portions 5b and 5e of the coupling shell. As the nozzle advances its taper 27d engages the latch rollers 13 and springs the latches 11 outwards. When the nozzle has reached the position shown in Figure 2 the extreme tip of the nozzle shell seats on the outer part of the annular seal 23 of the coupling and the nozzle valve seal 29 meets the outer face of the rim of the coupling valve 17. Until this position is reached both the coupling valve and the nozzle valve are closed. As the nozzle continues to advance from this position, it presses back the seal carrier 22 against the springs 26 and thereby rocks the levers 18 to displace the coupling valve 17 axially towards the mouth of the coupling. This movement of the coupling valve causes it to pass through the opening of the nozzle shell and unseat the nozzle valve plunger 28, 29 from the opening of the nozzle shell by pressing it inwards against its spring 33. This movement continues until the latch rollers 13 engage the groove 27b of the nozzle (see Figure 1).

If the nozzle is inserted so forcibly as to tend to spring the groove 27b past the rollers 13 the shoulder 27e of the nozzle meets the mating shoulder 5d of the coupling shell before the clearance between the nozzle taper 27d and the taper 5c of the coupling is fully taken up, thus preventing the possibility of these tapers wedging together and at the same time ensuring that the annular seal 23 does not become crushed.

When the nozzle is withdrawn from the coupling, which is effected by applying sufficient tension to spring the latch rollers 13 out of the annular groove 27b, the springs 26 cause the seal carrier 22 to follow the nozzle in its withdrawal, at the same time, through the action of the levers 18, withdrawing the coupling valve 17 inwards; and the nozzle valve spring 33 causes the nozzle valve plunger 28 to follow this movement of the coupling valve 17. The seals between the nozzle shell and the annular seal 23 and between the nozzle valve plunger 28 and the coupling valve 17 are therefore maintained until the nozzle valve 17 seats on the annular seal 23 (see Figure 2). In this position both the coupling valve and the nozzle valve are closed and the only fluid that can be spilt as the nozzle is further withdrawn is the small amount trapped between the annular seal 23 and the nozzle valve seal 29 in the clearance between the rims of the nozzle shell opening and of the coupling valve 17. Some clearance must be provided between the rim of the coupling valve 17 and the opening of the nozzle shell 27 to enable the valve 17 to pass through the opening of the nozzle shell. Further, cumulative manufacturing tolerances permit a slight amount of misalignment or/and eccentricity between these parts, and to enable the valve 17 to pass easily through the nozzle opening in spite of such misalignment or/and eccentricity the valve rim and the nozzle opening are respectively formed with male and female chamfers 17a and 27h which inevitably increase the clearance between these parts when in the position shown in Figure 2, but even so the clearance is quite small and the amount of fluid that can be trapped in it is virtually negligible.

When the coupling contains fluid under pressure the seal carrier 22 experiences a force assisting the springs 26, and therefore tending to close the coupling valve, equal to the fluid pressure multiplied by the area, projected at right angles to the axis of the coupling, contained between the parallel portion 5f of the coupling shell and the line of contact between the annular seal 23 and the rim of the valve 17. At the same time the valve itself experiences a force tending to open it equal to the fluid pressure multiplied by the projected area within the line of contact between the rim of the valve 17 and the annular seal 23.

These forces exert opposed moments about the fulcrums of the levers 18, which moments are proportional to the lengths of the inner and outer lever arms respectively, and the above-mentioned areas over which the fluid pressure acts are so proportioned that the moment of the valve-closing force exerted by the fluid pressure on the seal carrier is superior to that of the valve-opening force exerted by the fluid pressure on the valve itself, so that the fluid pressure tends to keep the valve closed and to relieve the springs 26; and the greater the fluid pressure the more firmly is the coupling valve held on its seating when the nozzle is not in the coupling. In the example illustrated, the inner arm of the levers 18, connected to the valve, is twice as long as the outer arm connected to the seal carrier 22 and consequently the effective projected area of the valve is made less than half the effective projected area of the seal carrier.

When the nozzle is inserted in the coupling the fluid pressure assists the springs 26 to maintain the seal between the annular seal 23 and the tip of the nozzle shell 27. When the valves are open and the nozzle shell is filled with fluid under the operating pressure, the latter affords some relief to the nozzle valve spring 33 in seating the nozzle valve sealing ring 29 on the rim of the coupling valve 17, provided the diameter of the circle of contact between the nozzle valve sealing ring 29 and the coupling valve 17 exceeds that of the sliding seals 32. Since the interior of the nozzle valve plunger and spider boss 30a is vented to atmosphere through the passage 34, the spring-relieving force on the nozzle valve plunger is equal to the fluid pressure multiplied by the projected area within the line of contact between the coupling valve 17 and the nozzle valve sealing ring 29 less the projected area of the bore of the spider boss 30a in contact with the sliding seals 32.

The seating force between the annular seal 23 and the tip of the nozzle shell 27 tends to push the nozzle out of the coupling. This force is augmented by the force exerted by the fluid on the plunger 28 tending to push the valve 17 inwards, and is relieved by the force exerted by the fluid pressure on the valve 17 tending to push it outwards, the resultant of the two last-named, opposed forces reacting on the seal-carrier through the levers 18. It is therefore desirable to make the relieving force as large as possible and to minimise the augmenting force.

It can be shown that the resultant force exerted by the fluid-pressure on the nozzle shell tending to push it out of the coupling is given by $$\frac{\pi}{4}(D_1^2 - D_2^2 - r.D_3^2)p$$

where $p$ is the fluid pressure, $r$ the ratio of inner to the outer arms of levers 18, $D_1$ the diameter of portion 5f, $D_2$ the sealing diameter of the annular seal 23 on nozzle shell 27, and $D_3$ the diameter of the bore of the spider-boss 30a on seal rings 32. Since the springs 26 and 33 both tend to push the nozzle out of the coupling it is desirable to select the diameters $D_1$, $D_2$, $D_3$ so that the quantity in the bracket of the above expression is as small as possible, having regard to other requirements.

When the nozzle and coupling are intended for flight refuelling purposes and the nozzle is mounted on an aircraft in a forwardly facing position, the part of the nozzle valve plunger 28 exposed in the terminal opening of the nozzle shell 27 (when the nozzle is not engaged in the coupling) is subjected to the ram pressure due to the forward speed of the aircraft and tending to unseat the valve plunger against the effort of the nozzle valve spring 33. At high forward speeds this ram pressure becomes very considerable and it is this condition that determines the strength of the nozzle valve spring. It is to relieve the nozzle valve spring in this condition that the vent 35 is provided in the tip of the nozzle valve plunger, enabling the pressure in the cavity enclosed by the plunger 28 and spider boss 30a to build up to a value approaching the ram pressure and exerting on the nozzle valve plunger a force opposed to the external ram pressure and tending to seat the valve plunger, thus considerably relieving the effort required of the nozzle valve spring 33 to keep the valve plunger 28 on its seating.

The atmospheric vent 34 and the ram pressure relieving vent 35 may also be utilised for circulating hot air through the interior of the above-mentioned cavity for de-icing purposes, the hot air being pumped into the cavity through the vent 34 and exhausted through the vent 35.

It will be seen that the construction illustrated lends itself to easy and rapid disconnection of the coupling from the hose or the like to which it is attached and facilitates dismantling of the coupling. On unscrewing the nut 7 the coupling immediately comes away from the ball fitting 9 and the slotted collar 6, levers 18, seal carrier 22 and coupling valve 17 can be extracted from the coupling as a unit without unmaking any other fastenings.

The foregoing description with reference to the drawings is illustrative only and not limitative of the scope of the invention, which is defined in the appended claims.

I claim:

1. A socket-like pipe-coupling member; said member comprising a shell having a throat, which is adapted to fit a complementary coupling nozzle, said member further comprising spring-loaded latches mounted on said shell and adapted to engage with such nozzle, levers fulcrumed in said shell, a poppet valve supported in the shell coaxially therewith for axial displacement therein and operatively engaged with the radially inner ends of the levers, a sleeve-like seal-carrier slidable coaxially in the shell and disposed axially inwards of the throat thereof and engaged by the radially outer ends of said levers, whereby axial displacements of said poppet valve and said seal-carrier relative to the shell take place in opposed senses, said poppet valve and said seal carrier having radially overlapping annular seating portions, spring means operative to press the seal carrier axially outwards and to withdraw the valve axially inwards and thereby cause the seating portion of said poppet valve normally to abut the seating portion on said seal-carrier, and an annular seal mounted on the seal-carrier and affording a seating for the margin of a terminal opening in the nozzle.

2. A socket-like pipe-coupling member as defined in claim 1, in which the annular seal extends radially from the axis of the member to meet the shell and seal the sliding joint between the shell and the seal-carrier.

3. The combination of claim 1 wherein said seal carrier and said valve normally close said throat of the shell and jointly resist outward pressure of the fluid within the shell, and in which the seal carrier has an annular radial surface exposed to the fluid pressure existing in the shell to urge said seal carrier toward seating position with respect to the valve, and the valve has a radial surface exposed to said fluid pressure in the shell to urge the valve away from seating relation with the seal carrier, the said levers being medially fulcrumed in said shell to transmit opposing moments of force resulting from said fluid pressure between said seal carrier and the valve, the fulcrums of the levers being located to unbalance said opposing moments of force in favor of said seal carrier.

4. A pipe-coupling assembly including a socket-like coupling member comprising a shell having a throat, latching means mounted on said shell and adapted to cooperate with corresponding means on a nozzle portion of the assembly, levers fulcrumed intermediate their length in said shell, a poppet valve supported coaxially in the shell and axially displaceable therein and operatively engaged with the radially inner ends of the levers, a sleeve-like seal-carrier mounted for sliding movement coaxially in the shell and disposed axially inwards of the throat thereof and engaged by the radially outer ends of said levers, said poppet valve and said seal carrier having radially overlapping annular mutually engaging seating portions, spring means carried by said shell and operative on said seal-carrier to press the seal-carrier axially outwards and to withdraw the valve axially inwards, thereby normally causing said valve to seat on said seal-carrier; said assembly further including a plug-like coupling member received by said socket-like member and comprising a nozzle having a terminal opening affording an internal annular valve seating, a part complementary to the throat of the shell of the socket-like coupling member and means releasably engaging said latching means on said shell, a valve plunger coaxially disposed in said nozzle and means supporting said plunger for axial displacement with respect to said nozzle, spring means carried by said nozzle, operatively connected to the plunger and urging said plunger towards said annular valve seating, a sealing ring mounted on the plunger and adapted to be seated on said annular seating and also on the marginal part of the outer face of the poppet valve of the socket-like member; and an annular seal mounted on the seal-carrier of said socket-like member and affording a seating for the margin of the terminal opening of the nozzle the poppet valve being abutted and the axial displacement of the poppet valve in the socket-like member opening the valve in the nozzle.

5. The combination of claim 4 wherein the said plunger when unseated is disposed inwardly of said annular seating and has a radial area exposed to fluid pressure whereby the plunger will be urged outwardly toward said seating by fluid pressure within the nozzle.

6. A plug-like pipe-coupling member comprising a nozzle-shell having a terminal opening affording an internal annular valve-seating, said shell having a part adapted to fit the throat of a complementary coupling socket and latch-engaging means adapted to receive spring-loaded latches mounted on said socket, an internal member rigidly connected with said shell, a valve plunger coaxially disposed in said shell and slidably supported by said internal member for axial displacement relatively to said shell, spring-means tending to move said plunger towards said valve seating, a sealing ring mounted on said plunger and seatable on said valve-seating and extending radially inwards thereof to engage the marginal part of a poppet valve axially displaceable in such socket, said plunger and said internal member enclosing a cavity of variable volume, means venting to the atmosphere the end of said cavity remote from the terminal opening of the nozzle, and further means for venting said cavity, said last-named means including an opening in the face of the plunger which is exposed through the terminal opening of the nozzle when the coupling member is separated from its complementary coupling socket.

References Cited in the file of this patent

UNITED STATES PATENTS

| 1,493,306 | Wilkinson | May 6, 1924 |
| 2,199,588 | Cobham et al. | May 7, 1940 |
| 2,307,427 | Smith et al. | Jan. 5, 1943 |
| 2,505,245 | Hollerith | Apr. 25, 1950 |
| 2,519,358 | Davies | Aug. 22, 1950 |
| 2,548,368 | Hartley | Apr. 10, 1951 |
| 2,637,572 | Bruce | May 5, 1953 |
| 2,665,928 | Omon et al. | Jan. 12, 1954 |